United States Patent
Kawanaka et al.

(10) Patent No.: US 9,728,782 B2
(45) Date of Patent: Aug. 8, 2017

(54) NEGATIVE ELECTRODE ACTIVE MATERIAL FOR LITHIUM ION SECONDARY BATTERY, NEGATIVE ELECTRODE FOR LITHIUM ION SECONDARY BATTERY, AND LITHIUM ION SECONDARY BATTERY

(71) Applicant: TDK CORPORATION, Tokyo (JP)

(72) Inventors: Yasuyuki Kawanaka, Tokyo (JP); Tomohiko Kato, Tokyo (JP); Atsushi Sano, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 14/693,143

(22) Filed: Apr. 22, 2015

(65) Prior Publication Data

US 2015/0311518 A1    Oct. 29, 2015

(30) Foreign Application Priority Data

Apr. 25, 2014  (JP) .................................. 2014-091688
Feb. 25, 2015  (JP) .................................. 2015-034954

(51) Int. Cl.

| | |
|---|---|
| *H01M 4/52* | (2010.01) |
| *H01M 4/525* | (2010.01) |
| *C01G 49/06* | (2006.01) |
| *H01M 4/04* | (2006.01) |
| *H01M 4/131* | (2010.01) |
| *H01M 4/1391* | (2010.01) |
| *H01M 10/052* | (2010.01) |
| *H01M 4/62* | (2006.01) |
| *H01M 4/02* | (2006.01) |

(Continued)

(52) U.S. Cl.
CPC ............ *H01M 4/525* (2013.01); *C01G 49/06* (2013.01); *H01M 4/0404* (2013.01); *H01M 4/0471* (2013.01); *H01M 4/131* (2013.01); *H01M 4/1391* (2013.01); *C01P 2004/03* (2013.01); *C01P 2004/10* (2013.01); *C01P 2004/50* (2013.01); *C01P 2004/62* (2013.01); *C01P 2004/90* (2013.01); *H01M 2/16* (2013.01); *H01M 4/622* (2013.01); *H01M 4/625* (2013.01); *H01M 10/052* (2013.01); *H01M 10/0525* (2013.01); *H01M 10/0568* (2013.01); *H01M 10/0569* (2013.01); *H01M 2004/021* (2013.01); *H01M 2004/027* (2013.01)

(58) Field of Classification Search
None
See application file for complete search history.

(56) References Cited

U.S. PATENT DOCUMENTS

2005/0285073 A1* 12/2005 Singh .................... A61K 9/5094
                                                                        252/62.54
2009/0305135 A1* 12/2009 Shi .......................... B82Y 30/00
                                                                         429/217

(Continued)

OTHER PUBLICATIONS

Nakata et al., Chains of Superparamagnetic Nanoparticles, Adv. Mater. 2008, 20, 4294-4299, 2008.*

(Continued)

*Primary Examiner* — Lucas J. O'Donnell
(74) *Attorney, Agent, or Firm* — Oliff PLC

(57) ABSTRACT

A negative electrode active material for a lithium ion secondary battery includes a network structure formed by at least some of iron oxide particles being linked to each other.

9 Claims, 2 Drawing Sheets

(51) Int. Cl.
　　　*H01M 2/16*　　　(2006.01)
　　　*H01M 10/0525*　　(2010.01)
　　　*H01M 10/0568*　　(2010.01)
　　　*H01M 10/0569*　　(2010.01)

(56) References Cited

U.S. PATENT DOCUMENTS

2013/0260246 A1* 10/2013 Chen .................. H01M 4/133
　　　　　　　　　　　　　　　　　　　　　429/221
2014/0004275 A1*　1/2014 Yin ...................... B82Y 30/00
　　　　　　　　　　　　　　　　　　　　　427/547

OTHER PUBLICATIONS

Reddy, M.V. et al., "a-Fe2O3 Nanoflakes as an Anode Material for Li-Ion Batteries," Advanced Functional Materials, vol. 17, (2007), pp. 2792-2799.

Hang, Bui Thi et al., "Effect of Binder Content on the Cycle Performance of Nano-Sized Fe2O3-loaded Carbon for Use as a Lithium Battery Negative Electrode," Journal of Power Sources, vol. 178, (2008), pp. 402-408.

Thackeray, M.M. et al., "High-Temperature Lithiation of a-Fe2O3: A Mechanistic Study," Journal of Solid State Chemistry, vol. 55, (1984), pp. 280-286.

Wang et al.; "α-Fe2O3 nanotubes with superior lithium storage capability" Chemical communications; vol. 47; Jun. 16, 2011; pp. 8061-8063.

* cited by examiner

OXIDE WIRE DIAMETER

NETWORK PORE AREA

NEGATIVE ELECTRODE ACTIVE MATERIAL FOR LITHIUM ION SECONDARY BATTERY, NEGATIVE ELECTRODE FOR LITHIUM ION SECONDARY BATTERY, AND LITHIUM ION SECONDARY BATTERY

CROSS-REFERENCE TO RELATED APPLICATION

This application claims priority from Japanese Patent Application No. 2014-091688 filed with the Japan Patent Office on Apr. 25, 2014, the entire content of which is hereby incorporated by reference.

BACKGROUND

1. Technical Field

The present disclosure relates to a negative electrode active material for a lithium ion secondary battery, a negative electrode for a lithium ion secondary battery, and a lithium ion secondary battery.

2. Related Art

A lithium ion secondary battery is lighter in weight and has higher capacity than a nickel-cadmium battery, a nickel hydride battery, and the like. Thus, lithium ion secondary batteries are widely used as a power supply for portable electronic devices. The lithium ion secondary battery is also a strong candidate for a power supply mounted on hybrid automobiles or electric automobiles. With the decrease in size and increase in functionality of portable electronic devices in recent years, the lithium ion secondary battery used for the power supply is expected to have higher capacity.

The capacity of the lithium ion secondary battery is mainly dependent on an electrode active material. Generally, as a negative electrode active material, graphite is utilized. However, the theoretical capacity of graphite is 372 mAh/g, and a battery with capacity of approximately 350 mAh/g is already put to practical use. In order to obtain a nonaqueous electrolyte secondary battery having sufficient capacity as an energy source for future high-functionality portable devices, even higher capacity needs to be provided. For this purpose, a negative electrode material with greater theoretical capacity than that of graphite is necessary.

An example of such negative electrode active material is a composition containing an iron oxide (oxide containing iron as a constituent element), such as $Fe_2O_3$. The iron oxide is capable of electrochemical adsorption and desorption of lithium ions, and is also capable of charging and discharging of much higher capacity than graphite. In particular, the theoretical discharge capacity of $Fe_2O_3$ is 1005 mAh/g. Namely, $Fe_2O_3$ is known to have 2.7 times as high as that of graphite (JOURNAL OF SOLID STATE CHEMISTRY 55, 280-286 (1984); Adv. Funct. Mater. 2007, 17, 2792-2799; and Journal of Power Sources 178 (2008) 402-408).

SUMMARY

A negative electrode active material for a lithium ion secondary battery according to an embodiment of the present disclosure includes a network structure formed by at least some of iron oxide particles being linked to each other.

DETAILED DESCRIPTION OF EMBODIMENTS

Figure 1:
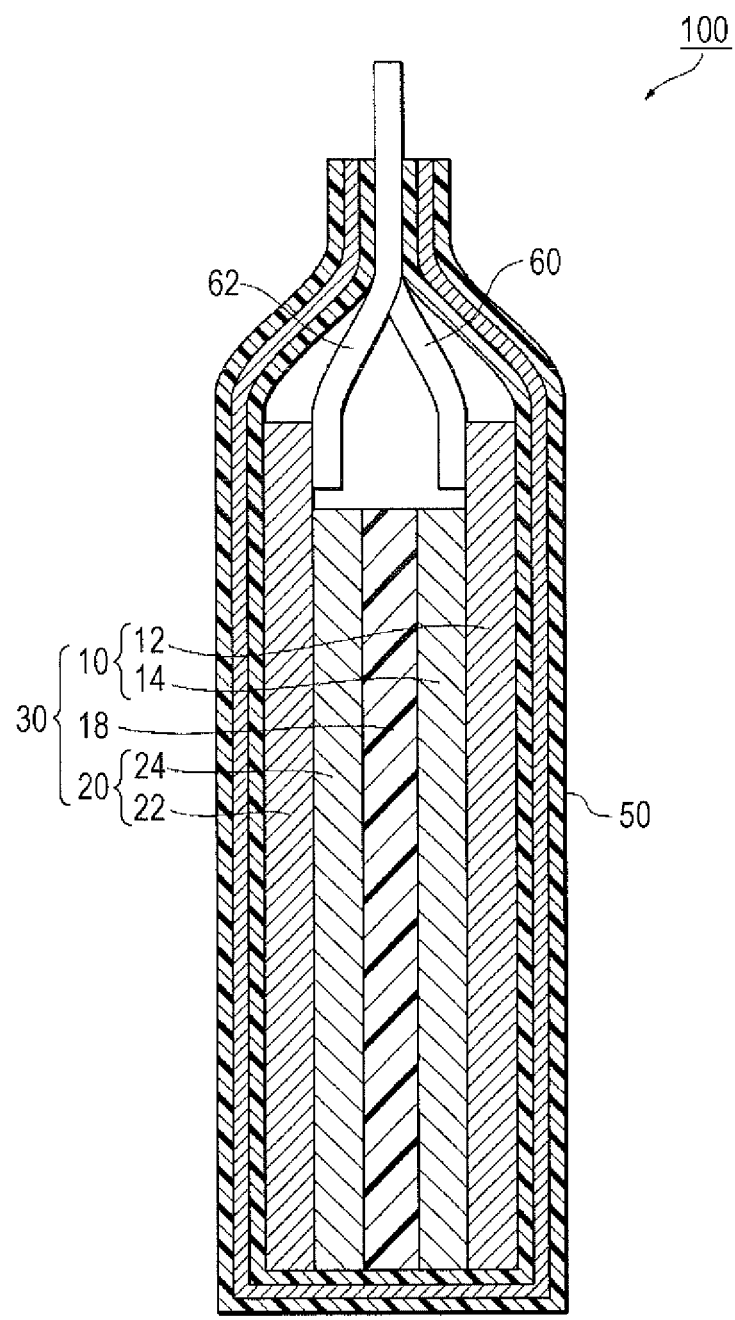
FIG. 1 is a schematic cross-sectional view of a lithium ion secondary battery according to an embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

An iron-based oxide such as $Fe_2O_3$ develops volume expansion and shrinkage at the time of charging and discharging, whereby a negative electrode active material may become disintegrated and pulverized. As a result, the contact between the negative electrode active material and a conductive auxiliary agent is lost, and the negative electrode active material becomes isolated, resulting in a gradual decrease in discharge capacity.

An object of the present disclosure is to provide a negative electrode active material for a lithium ion secondary battery having favorable charging and discharging cycle characteristics, and a lithium ion secondary battery using the negative electrode active material.

A negative electrode active material for a lithium ion secondary battery according to an embodiment of the present disclosure, which achieves the above object, includes a network structure formed by at least some of iron oxide particles being linked to each other.

According to the negative electrode active material having such a configuration, active materials included in electrodes can be prevented from being disintegrated when the iron oxide particles are expanded because the iron oxide particles are linked in a network shape. Thus, excellent charging and discharging cycle characteristics can be obtained.

In the negative electrode active material according to the embodiment of the present disclosure, a ratio of the average network pore diameter to the average iron oxide wire diameter (average network pore diameter/average iron oxide wire diameter) in the network structure may be 0.2 or more.

In the negative electrode active material for a lithium ion secondary battery according to the embodiment of the present disclosure, the iron oxide with the network structure may have an average iron oxide wire diameter of 192 nm or less.

Further, as a conductive auxiliary agent contained in the negative electrode active material for the lithium ion secondary battery according to the embodiment of the present disclosure, Ketjen black may be used.

The embodiment of the present disclosure provides a negative electrode active material for a lithium ion secondary battery having favorable charging and discharging cycle characteristics, and a lithium ion secondary battery using the negative electrode active material.

In the following, a preferred embodiment of the present disclosure will be described with reference to the drawings. The present disclosure is not limited to the embodiment described below. The components described below may include other components that may readily occur to those skilled in the art, or other substantially similar components. Further, the components described below may be combined as needed.

(Lithium Ion Secondary Battery)

FIG. 1 is a cross-sectional view illustrating a structure of a lithium ion secondary battery 100.

The lithium ion secondary battery 100 of FIG. 1 includes a case 50, an electrode body 30, and a nonaqueous electrolytic solution containing an electrolyte. The electrode body 30 includes a positive electrode 10, a separator 18, and a negative electrode 20 that are stacked in the case. The separator 18 is disposed between the positive electrode 10 and the negative electrode 20. The separator 18 retains the nonaqueous electrolytic solution. The nonaqueous electrolytic solution serves as a transfer medium for lithium ions between the positive and negative electrodes at the time of charging and discharging.

The lithium ion secondary battery 100 further includes a negative electrode lead 62 and a positive electrode lead 60. One end of the negative electrode lead 62 is electrically connected to the negative electrode 20, while the other end protrudes out of the case. One end of the positive electrode lead 60 is electrically connected to the positive electrode 10, while the other end protrudes out of the case.

The shape of the lithium ion secondary battery is not particularly limited, and may be a cylindrical shape, a rectangular shape, a coin-like shape, a flat shape, a laminated film shape, for example. In the embodiment of the present disclosure, a laminated film is used for the case 50. In examples described below, an aluminum-laminated film type battery is fabricated and evaluated.

The positive electrode 10 includes a positive electrode active material layer 14 disposed on at least one main plane of a positive electrode current collector 12. The positive electrode active material layer 14 includes a positive electrode active material that adsorbs and desorbs lithium ions, a conductive auxiliary agent, and a binder. The negative electrode 20 includes a negative electrode active material layer 24 disposed on at least one main plane of the negative electrode current collector 22. The negative electrode active material layer 24 includes a negative electrode active material that adsorbs and desorbs lithium ions, a conductive auxiliary agent, and a binder.

(Negative Electrode)

The negative electrode active material layer 24 formed on the negative electrode 20 according to the embodiment contains a negative electrode active material, a binder, and a conductive auxiliary agent.

In order to manufacture the negative electrode active material layer 24, first, a paint including the negative electrode active material, the binder, the conductive auxiliary agent, and a solvent is coated onto the negative electrode current collector 22. Then, the solvent in the paint coated on the negative electrode current collector 22 is removed, fabricating the negative electrode active material layer 24.

Figure 2:
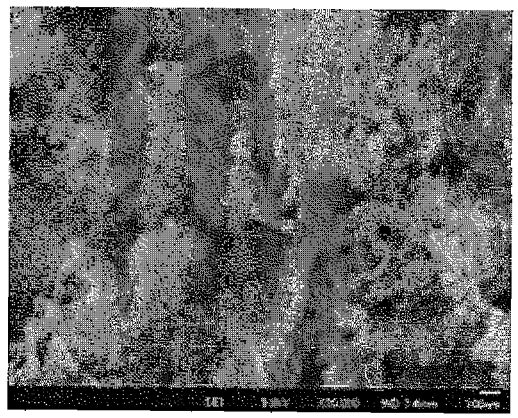
FIG. 2 is an SEM image of an iron oxide with a network structure used in the embodiment.

The negative electrode active material is an iron oxide forming a network structure as shown in FIG. 2.

Because iron oxide particles are linked in a network shape, disintegration of the negative electrode active material can be prevented even when the negative electrode active material is expanded during charging. As a result, excellent charging and discharging cycle characteristics can be obtained.

The network structure refers to a structure having a cyclic structure formed of three or more particles linked together. In other words, in the network structure, a net is formed by a plurality of connected particles forming chains by links between the particles. The "link" herein refers to a state in which a plurality of primary particles has grown together through necking.

As seen from FIG. 2, in the structure, the chains formed by the linking of the iron oxide particles are branched and then linked again at the end. Thus, a structure including holes surrounded by the chains is formed. These holes are believed to provide an advantageous effect on the cycle characteristics.

The active material as a whole may have the network structure. However, it is not required that the active material as a whole has the network structure. It is only required that the network structure is formed to such an extent that the effect of easing the stress due to the expansion of the active material can be obtained. For example, the network structure may be formed by 60% or more of the negative electrode active material as a whole.

Figure 3:
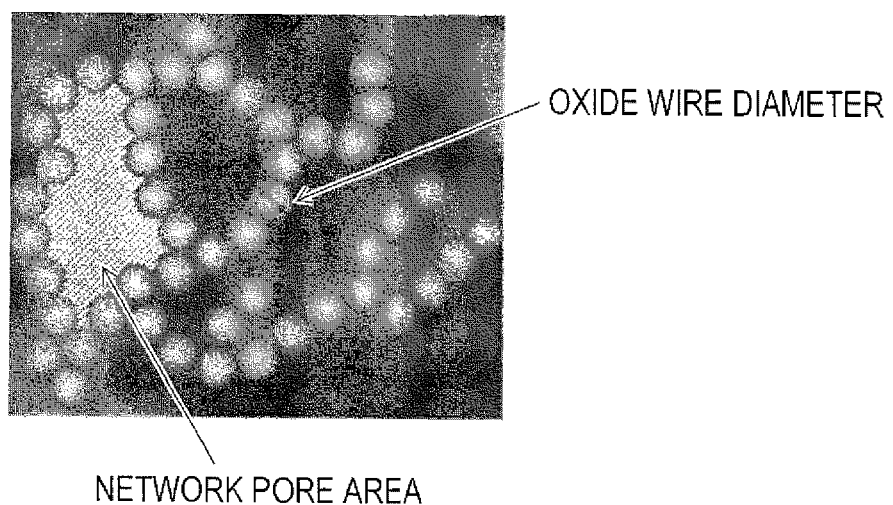
FIG. 3 conceptually illustrates an iron oxide wire diameter and a network pore area of the iron oxide with the network structure used in the embodiment.

The above-described network structure is extended like a thread by linkage of the chains. The thread forms a net. The thread may have a predetermined thickness. The holes formed by the network structure may have a predetermined area. As illustrated in FIG. 3, when substantially spherical particles are linked to one another to have a thread-like shape, an average particle diameter of the particles corresponds to the thickness of the thread. In the following, an average value of the thickness of the thread will be referred to as an average iron oxide wire diameter.

The area of the holes formed by the network structure (network pore area) is determined by observing the network structure using a scanning electron microscope (SEM). Specifically, from a two-dimensional photograph of the network structure obtained by the observation, a space enclosed by a thread forming a net can be calculated as the network pore area. By obtaining an average value of the network pore areas, an average network pore diameter can be determined.

The ratio of the average network pore diameter of the network structure including iron oxide to the average iron oxide wire diameter (average network pore diameter/average iron oxide wire diameter) may be 0.2 or more and 20 or less.

A more specific method for measuring the average network pore diameter and the average iron oxide wire diameter will be described with reference to a conceptual diagram of the iron oxide wire diameter and the network pore area illustrated in FIG. 3. The iron oxide wire diameter is measured at 20 points by using a scanning electron microscope (SEM) image. A trimmed mean excluding the upper and lower 10% of the resultant iron oxide wire diameters can be calculated as the average iron oxide wire diameter.

Similarly, from around the iron oxide particles measured for the average iron oxide wire diameter using the SEM image, network pores are randomly selected and their areas are measured. A trimmed mean excluding the upper and lower 10% of the randomly selected 20 points of network pore areas is calculated as the average network pore area. Further, from the resultant average network pore area, the average network pore diameter can be calculated using the following mathematical formula (1), where $\pi$ is the circular constant.

$$\text{Average network pore diameter} = 2 \times \sqrt{\frac{\text{Average network pore area}}{\pi}} \quad (1)$$

The average iron oxide wire diameter of the iron oxide forming the network structure may be 192 nm or less, or 98 nm or less.

When the ratio of the average network pore diameter to the average iron oxide wire diameter (average network pore diameter/average iron oxide wire diameter) is 0.2 or more, the stress to the iron oxide particles caused by iron oxide particle volume expansion accompanying charging can be eased. Thus, the network structure can be maintained, and the contact between the iron oxide particles and the conductive auxiliary agent is not lost. As a result, excellent charging and discharging cycle characteristics can be obtained. The iron oxide particles forming the network structure may have a primary particle diameter of 10 nm or more and 100 nm or less.

When the average iron oxide wire diameter is 192 nm or less, the stress due to iron oxide particle volume expansion accompanying charging is small. Thus, disintegration of the network structure can be particularly prevented. As a result, excellent charging and discharging cycle characteristics can be obtained.

As the iron oxide, FeO, $Fe_2O_3$, $Fe_3O_4$ or the like may be used. In particular, $Fe_2O_3$ with the largest theoretical capacity may be used. Further, by using $\alpha$-$Fe_2O_3$ which is thermodynamically stable, excellent charging and discharging cycle characteristics can be obtained. As the negative electrode active material, $\alpha$-$Fe_2O_3$ may be used either individually or in combination with other iron oxides. In another example, the iron oxide may be used in combination with a negative electrode active material, such as a metal capable of forming a compound with lithium such as silicon or tin, an amorphous compound mainly containing an oxide of the metal, lithium titanate ($Li_4Ti_5O_{12}$), or graphite.

The content of the negative electrode active material in the negative electrode active material layer 24 may be 50 to 95 mass %, or 75 to 93 mass %, with respect to a total of the masses of the negative electrode active material, the conductive auxiliary agent, and the binder. When the content of the negative electrode active material is in the above range, a negative electrode having large capacity can be obtained.

(Method for Fabricating Negative Electrode Active Material)

A two-solution flow-type supercritical hydrothermal synthesis device was used to synthesize $\alpha$-$Fe_2O_3$ having a network structure. First, soluble iron salt and neutralizer were dissolved in water, preparing an iron solution. The iron solution was then passed through a preheating tube, a reaction tube, and a cooling tube in order at a flow rate of 25 to 120 ml/min. Also, 30% hydrogen peroxide water as an oxidant was passed through the reaction tube and the cooling tube in order at a flow rate of 18 to 36 ml/min. Under conditions of a preheating temperature of 180° C. and a reaction temperature of 400° C., supercritical hydrothermal synthesis was performed in such a manner. The two-solution flow-type supercritical hydrothermal synthesis device was designed such that the iron solution and the 30% hydrogen peroxide water would be mixed immediately before the reaction tube. The resultant slurry was filtered, rinsed in water, ethanol-cleaned, and dried. Thereafter, the dried slurry was fired in air, fabricating $\alpha$-$Fe_2O_3$ having a network structure.

As the iron salt, ferric chloride, ferrous sulfate, ferric nitrate, ferric citrate, iron phosphate or the like may be used. From the viewpoint of solubility in water, ferric chloride, ferrous sulfate, or ferric nitrate may preferably be used. Hydrates of the above examples may also be used. Further, one or more of the above examples may be used in combination. Iron source charging concentration may be 0.1 to 1.0 M. When the iron source charging concentration is lower than 0.1 M, necking growth between $\alpha$-$Fe_2O_3$ particles do not easily occur. As a result, it becomes difficult to obtain $\alpha$-$Fe_2O_3$ having a network structure. When the iron source charging concentration is higher than 1.0 M, the viscosity of the slurry after synthesis is increased. As a result, the likelihood of pipe clogging increases.

As the neutralizer, monoethanolamine, triethanolamine, urea or the like may be used. In order to suppress production of acid in the aqueous solution resulting from the reaction, the amount of the added neutralizer may be largely excessive as compared to the amount of the iron salt anion.

The filtering method is not particularly limited. Known filter paper with a pore size such that the produced $\alpha$-$Fe_2O_3$ can be trapped may be used. For example, filter paper, glass filter, or membrane filter may be used.

The drying method may be performed at 150° C. or lower to prevent drying coagulation. In particular, reduced-pressure drying may be performed at 60 to 90° C. for 6 to 12 hours.

The firing method may be performed at 800° C. or lower to suppress $\alpha$-$Fe_2O_3$ grain growth. In particular, the firing may be performed in air at 400 to 600° C. for 1 to 6 hours.

(Binder)

The binder binds negative electrode active materials and also binds the negative electrode active material and the current collector 22. The binder is not particularly limited as long as the binder is capable of achieving the above binding. Examples of the binder include fluorine resin such as polyvinylidene fluoride (PVDF), cellulose, styrene-butadiene rubber, polyimide, polyamide-imide, polyacrylic acid, polyacrylonitrile, and polyalginic acid.

The content of the binder in the negative electrode active material layer 24 is not particularly limited, and may be 1 to 30 mass % with respect to the total of the masses of the negative electrode active material, the conductive auxiliary agent, and the binder. In particular, the content may be 5 to 15 mass %.

(Conductive Auxiliary Agent)

The conductive auxiliary agent is not particularly limited as long as the agent is capable of improving the conductivity of the negative electrode active material layer 24. Known conductive auxiliary agent may be used. Examples thereof include: carbon blacks such as acetylene black, furnace black, channel black, thermal black, and Ketjen black; carbon fibers such as vapor-grown carbon fiber (VGCF) and carbon nanotube; and carbon material such as graphite. One or more types of these examples may be used.

From the viewpoint of conductivity, Ketjen black may preferably be used. By using Ketjen black, favorable conductive path is formed between the conductive auxiliary agent and the iron oxide. As a result, excellent charging and discharging cycle characteristics can be obtained.

The content of the conductive auxiliary agent in the negative electrode active material layer 24 is also not particularly limited. When added, normally, the content may be 1 to 10 mass % with respect to the total of the masses of the negative electrode active material, the conductive auxiliary agent, and the binder.

(Solvent)

The solvent is not particularly limited as long as the solvent is capable of rendering the negative electrode active material, the conductive auxiliary agent, and the binder into a paint. For example, N-methyl-2-pyrrolidone and N,N-dimethyl formamide may be used.

(Negative Electrode Current Collector)

The negative electrode current collector 22 may be a conductive plate material having a small thickness. In particular, the negative electrode current collector 22 may be a metal foil with a thickness of 8 to 30 μm. The negative electrode current collector 22 may be formed from a material that does not form an alloy with lithium. For example, copper is particularly preferable. Examples of such copper foil include electrolytic copper foil. The electrolytic copper foil is obtained by, for example, causing a current to flow while a metal drum immersed in copper ions-dissolved electrolyte is rotated. Copper is precipitated on the drum surface and then is detached, whereby electrolytic copper foil is obtained.

The copper foil may be pressed copper foil manufactured by pressing cast copper ingot into a desired thickness. The pressed copper foil may be used after the surface of copper precipitated on the surface of the pressed copper foil by electrolytic process is made coarse.

The coating method is not particularly limited. Methods that are normally adopted for fabricating an electrode may be used. Examples thereof include a slit die coating method and a doctor blade method.

The method for removing the solvent in the paint coated on the negative electrode current collector 22 is not particularly limited. For example, the negative electrode current collector 22 coated with the paint may be dried at 80° C. to 150° C.

The negative electrode 20 including the negative electrode active material layer 24 formed as described above may be thereafter subjected to a pressing process using a roll press device or the like, as needed. The roll press may have a linear pressure of 100 to 5000 kgf/cm, for example.

(Nonaqueous Electrolytic Solution)

The nonaqueous electrolytic solution includes a non-aqueous solvent and an electrolyte dissolved in the non-aqueous solvent. The nonaqueous electrolytic solution may contain, as the non-aqueous solvent, a cyclic carbonate and a chain carbonate.

The cyclic carbonate is not particularly limited as long as the carbonate is capable of electrolyte solvation. Known cyclic carbonates may be used. For example, ethylene carbonate, propylene carbonate, or butylene carbonate may be used.

The chain carbonate is not particularly limited as long as the carbonate is capable of decreasing the viscosity of the cyclic carbonate. Known chain carbonates may be used. For example, diethyl carbonate, dimethylcarbonate, or ethylmethyl carbonate may be used. In other examples, methyl acetate, ethyl acetate, methyl propionate, ethyl propionate, γ-butyrolactone, 1,2-dimethoxyethane, or 1,2-diethoxyethane may be used in combination with cyclic and chain carbonates.

The ratio of the cyclic carbonate to the chain carbonate in the non-aqueous solvent may be 1:9 to 1:1 by volume.

Examples of the electrolyte that may be used include lithium salts of $LiPF_6$, $LiClO_4$, $LiBF_4$, $LiCF_3SO_3$, $LiCF_3$, $CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(CF_3CF_2CO)_2$, and LiBOB. One or more of the lithium salts may be used either individually or in combination of two or more types. In particular, from the viewpoint of conductivity, $LiPF_6$ may also be included.

When $LiPF_6$ is dissolved in the non-aqueous solvent, the concentration of the electrolyte in the nonaqueous electrolytic solution may be adjusted to 0.5 to 2.0 mol/L. When the concentration of the electrolyte is 0.5 mol/L or more, sufficient conductivity of the nonaqueous electrolytic solution can be ensured. Further, sufficient capacity can be readily obtained at the time of charging and discharging. By suppressing the electrolyte concentration within 2.0 mol/L, sufficient lithium ion mobility can be ensured while suppressing an increase in the viscosity of the nonaqueous electrolytic solution. Thus, sufficient capacity can be readily obtained at the time of charging and discharging.

Even when $LiPF_6$ is mixed with another electrolyte, the lithium ion concentration in the nonaqueous electrolytic solution can be adjusted to 0.5 to 2.0 mol/L. The concentration of the lithium ion from $LiPF_6$ may be 50 mol % or more.

(Positive Electrode)

The positive electrode 10 according to the embodiment has a structure such that the positive electrode active material layer 14 containing a positive electrode active material is formed on one surface or both surfaces of the positive electrode current collector 12. The positive electrode active material layer 14 can be manufactured by coating a paint containing the positive electrode active material, a binder, a conductive auxiliary agent, and a solvent onto the positive electrode current collector 12 through the same steps as those of the negative electrode manufacturing method. By removing the solvent from the paint coated on the positive electrode current collector 12, the positive electrode 10 is manufactured.

The positive electrode active material is not particularly limited as long as the material is a substance capable of reversibly proceeding adsorption and desorption of lithium ions, deintercalation and insertion (intercalation) of lithium ions, or doping and undoping of lithium ions and counter anions of the lithium ions (such as $ClO_4^-$). Any known electrode active material may be used. Examples thereof include lithium cobalt oxide ($LiCoO_2$), lithium nickel oxide ($LiNiO_2$), lithium manganese spinel ($LiMn_2O_4$), a mixed metal oxide expressed by the general formula: $LiNi_xCo_yMn_zO_2$ (x+y+z=1), lithium vanadium compound ($LiV_2O_5$), and $LiMPO_4$ (where M is Co, Ni, Mn, Fe, or VO).

Oxides and sulfides capable of lithium ion adsorption and desorption may also be used as the positive electrode active material.

For the constituent elements other than the positive electrode active material (the conductive auxiliary agent and the binder), the same substances used for the negative electrode 20 may be used.

As the positive electrode current collector 12, various known metal foils used in current collectors for lithium ion secondary batteries may be used. For example, metal foil of aluminum, stainless steel, nickel, titanium, or alloys thereof may be used. In particular, aluminum foil may be used.

(Separator)

The material, the manufacturing method and the like of the separator 18 are not particularly limited as long as the separator 18 is formed from an insulating porous structure. Known separators used in lithium ion secondary batteries may be used. Examples of the insulating porous structure include known polyolefin resins, specifically crystalline homopolymers or copolymers obtained by polymerizing polyethylene, polypropylene, 1-butene, 4-methyl-1-pentene, 1-hexene and the like. One type of the homopolymers and copolymers may be used individually. Two or more types of these polymers may be used in combination. The separator 18 may include a single layer structure or a complex layer structure.

(Case)

The case 50 is not particularly limited as long as the case is capable of preventing electrolyte leakage to the outside and entry of water and the like into the lithium ion secondary battery 100 from the outside. Metal can or aluminum-laminated film may be used. For example, the aluminum-laminated film is provided such that a three-layer structure is formed by polypropylene, aluminum, and nylon stacked in this order.

The positive electrode lead 60 and the negative electrode lead 62 may be formed from a conductive material such as aluminum or nickel.

The embodiment of the present disclosure has been described in detail, but the present disclosure is not limited to the foregoing embodiment. The embodiment described above in detail may be variously modified. For example, in the foregoing embodiment, the lithium ion secondary battery has the laminate film structure. However, the lithium secondary battery according to the embodiment of the present disclosure may be a lithium ion secondary battery with a structure such that the positive electrode and the negative electrode are folded or a structure such that the positive electrode and the negative electrode are stacked. Further, the shape of the lithium ion secondary battery may include a coin-like shape, a rectangular shape, and a flat shape, for example.

The charging and discharging cycle characteristics of a fabricated lithium ion secondary battery was evaluated by the following method.
(Measurement of Charging and Discharging Cycle Characteristics)

The charging and discharging cycle characteristics were evaluated by performing charging at a current value of 0.5 C and discharging at a current value of 1.0 C in a voltage range of 4.0 V to 1.0 V with use of a secondary battery charging and discharging test device. Herein, a current value of 1 C refers to a current value such that, when constant current charging or constant current discharging is performed using a battery cell with capacity of a nominal capacity value, the charging or discharging can be completed in just one hour.

The capacity retention (%) is expressed as the ratio of the discharge capacity of each cycle to an initial discharge capacity which is the discharge capacity of the first cycle, according to the following mathematical formula (2).

$$\text{Discharge capacity retention (\%)} = \frac{\text{Discharge capacity of each cycle}}{\text{Initial discharge capacity}} \times 100 \quad (2)$$

The higher the capacity retention is, the better the charging and discharging cycle characteristics are. In Examples and Comparative Examples, charging and discharging were repeated under the above conditions with use of fabricated lithium ion secondary batteries. The charging and discharging cycle characteristics were evaluated based on the capacity retention after 100 cycles.

In the following, the lithium ion secondary battery according to the embodiment of the present disclosure will be described in further detail with reference to Examples and Comparative Examples. The lithium ion secondary battery is not limited to secondary batteries described in these examples.

The lithium ion secondary batteries used in Examples 1 to 16 and in Comparative Examples 1 to 4 were fabricated according to the procedure described below.

EXAMPLES

Example 1-1

(Preparation of Negative Electrode Active Material)
An iron solution containing 0.45 M of ferrous sulfate hydrate (78% as $Fe_2(SO_4)_3$) and 2.4 M of triethanolamine was prepared. Then, the iron solution was passed through a preheating tube, a reaction tube, and a cooling tube in order at a flow rate of 80 ml/min. In such a manner, supercritical hydrothermal synthesis was performed under the conditions of a flow rate of 30 ml/min of 30% hydrogen peroxide water and a reaction temperature of 400° C. The obtained slurry was filtered, rinsed, ethanol-cleaned, and dried. Thereafter, the dried slurry was fired in air at 500° C. for three hours, whereby $\alpha$-$Fe_2O_3$ used for Example 1-1 was prepared.

An SEM observation image of the obtained iron oxide is shown in FIG. 2. As can be seen from FIG. 2, it was found out that the obtained iron oxide particles were mutually linked to form a networked complex network structure.
(Fabrication of Negative Electrode)

85 parts by mass of the $\alpha$-$Fe_2O_3$ prepared for Example 1-1 as the negative electrode active material, 5 parts by mass of Ketjen black as the conductive auxiliary agent, and 10 parts by mass of polyamide-imide as the binder were mixed to prepare a negative electrode mixture. Then, the negative electrode mixture was dispersed in N-methyl-2-pyrrolidone to prepare a paste of negative electrode mixture paint. The paint was coated onto one surface of an electrolytic copper foil with a thickness of 10 μm such that the amount of coating of the negative electrode active material was 2.5 mg/cm$^2$. Thereafter, the coated electrolytic copper foil was dried at 100° C. to form a negative electrode active material layer. Then, pressure forming was implemented at a linear pressure of 2000 kgf/cm using a roller press. Finally, heating was performed in vacuum at 350° C. for three hours, and thus a negative electrode with a thickness of 70 μm was fabricated.
(Fabrication of Positive Electrode)

90 parts by mass of $LiCoO_2$ as the positive electrode active material, 5 parts by mass of acetylene black as the conductive auxiliary agent, and 5 parts by mass of polyvinylidene fluoride as the binder were mixed to prepare a positive electrode mixture. The positive electrode mixture was then dispersed in N-methyl-2-pyrrolidone to prepare a paste of positive electrode mixture paint. The paint was coated onto one surface of an aluminum foil with a thickness of 20 μm such that the amount of coating of the positive electrode active material was 18.4 mg/cm$^2$. Thereafter, the coated aluminum foil was dried at 100° C. to form a positive electrode active material layer. Then, by pressure forming using a roll press, a positive electrode with a thickness of 132 μm was fabricated.
(Fabrication of Lithium Ion Secondary Battery for Evaluation)

The fabricated negative electrode and positive electrode were stacked via a polypropylene separator with a thickness of 16 μm, whereby a stacked body was fabricated. Three sheets of the negative electrode, two sheets of the positive electrode, and four sheets of the separator were used. The negative electrode and the positive electrode were alternately stacked via the separator. Further, in the negative electrode of the electrode body, a nickel negative electrode lead was attached to a protruding end portion of the copper foil to which the negative electrode active material layer was not provided. On the other hand, in the positive electrode of the stacked body, an aluminum positive electrode lead was attached to a protruding end portion of the aluminum foil to which the positive electrode active material layer was not provided, using an ultrasonic welding machine. The stacked body was then inserted into a case of aluminum-laminated film. Thereafter, a closed opening was formed by heat-sealing the case except for one location around the case. A nonaqueous electrolytic solution containing a solvent including EC/DEC at a compounding ratio of 3:7 and 1 M (mol/L) of $LiPF_6$ added into the solvent as a lithium salt was injected into the case. Thereafter, the remaining one location was heat-sealed using a vacuum sealing machine under reduced pressure so as to hermetically seal the case, whereby the lithium ion secondary battery according to Example 1-1 was fabricated.

Examples 1-2 to 1-16

By modifying the iron raw material, the amount of iron source charging, the amount of triethanolamine charging, the iron solution pump flow rate, and the hydrogen peroxide water pump flow rate to values shown in Table 1, $\alpha$-$Fe_2O_3$ according to Examples 1-2 to 1-16 each having the size of an average network pore diameter and an average iron oxide wire diameter shown in Table 1 were obtained. It was confirmed through SEM observation that the iron oxide according to Examples 1-2 to 1-16 also formed a networked complex network structure by mutual linking of particles as in Example 1-1.

Further, the lithium ion secondary batteries according to Examples 1-2 to 1-16 were fabricated in the same manner as in Example 1-1, using the $\alpha$-$Fe_2O_3$ of Examples 1-2 to 1-16.

Comparative Examples 1-1 and 1-2

By modifying the iron raw material, the amount of iron source charging, the amount of triethanolamine charging, the iron solution pump flow rate, and the hydrogen peroxide water pump flow rate to values shown in Table 1, $\alpha$-$Fe_2O_3$ according to Comparative Examples 1-1 and 1-2 each having an average particle diameter D50 shown in Table 1 were obtained. The lithium ion secondary batteries according to Comparative Examples 1-1 and 1-2 were fabricated in the same manner as in Example 1-1 using the $\alpha$-$Fe_2O_3$ of Comparative Examples 1-1 and 1-2.

Comparative Example 1-3

By firing a ferric citrate hydrate in the atmosphere at 500° C. for three hours, $\alpha$-$Fe_2O_3$ was obtained. Then, the obtained $Fe_2O_3$ was pulverized using a planetary ball mill, whereby $\alpha$-$Fe_2O_3$ of Comparative Example 1-3 having an average particle diameter D50 of 267 nm was obtained. As a planetary ball mill medium, zirconia beads with a diameter of 3 mm were used. The rotational speed of the planetary ball mill was 500 rpm, and the pulverizing mixing time was 120 min. The average particle diameter D50 was measured using a laser diffracting particle diameter distribution measuring device. The lithium ion secondary battery according to Comparative Example 1-3 was fabricated using the $\alpha$-$Fe_2O_3$ of Comparative Example 1-3.

Comparative Example 1-4

By firing ferric citrate hydrate in the same manner as in Comparative Example 1-3, $\alpha$-$Fe_2O_3$ was obtained. Then, the obtained $\alpha$-$Fe_2O_3$ was pulverized using a planetary ball mill, whereby $Fe_2O_3$ of Comparative Example 1-4 having an average particle diameter D50 of 631 nm was obtained. As a planetary ball mill medium, zireonia beads with a diameter of 3 mm were used. The rotational speed of the planetary ball mill was 500 rpm, and the pulverizing mixing time was 25 min. The lithium ion secondary battery according to Comparative Example 1-4 was fabricated using the $\alpha$-$Fe_2O_3$ of Comparative Example 1-4.

Example 2-1

The negative electrode of example 2-1 was fabricated in the same manner as in Example 1-1 except that acetylene black was used as the conductive auxiliary agent. The lithium ion secondary battery of Example 2-1 was fabricated in the same manner as in Example 1-1 using the obtained negative electrode of Example 2-1.

Example 2-2

The negative electrode of Example 2-2 was fabricated in the same manner as in Example 1-4 except that acetylene black was used as the conductive auxiliary agent. The lithium ion secondary battery of Example 2-2 was fabricated in the same manner as in Example 1-1 using the obtained negative electrode of Example 2-2.

Example 2-3

The negative electrode of Example 2-3 was fabricated in the same manner as in Example 1-9 except that acetylene black was used as the conductive auxiliary agent. The lithium ion secondary battery of Example 2-3 was fabricated in the same manner as in Example 1-1 using the obtained negative electrode of Example 2-3.

Example 2-4

The negative electrode of Example 2-4 was fabricated in the same manner as in Example 1-11 except that acetylene black was used as the conductive auxiliary agent. The lithium ion secondary battery of Example 2-4 was fabricated in the same manner as in Example 1-1 using the obtained negative electrode of Example 2-4.

Comparative Example 2-1

The negative electrode of Comparative Example 2-1 was fabricated in the same manner as in Comparative Example 1-1 except that acetylene black was used as the conductive auxiliary agent. Using the obtained negative electrode of Comparative Example 2-1, the lithium ion secondary battery of Comparative Example 2-1 was fabricated in the same manner as in Example 1-1.

The charging and discharging cycle characteristics of the fabricated lithium ion secondary batteries according to Examples 1-1 to 1-16, Examples 2-1 to 2-4, Comparative Examples 1-1 to 1-4, and Comparative Example 2-1 were measured by the above-described method of measuring the charging and discharging cycle characteristics. The capacity retention after 100 cycles of the respective lithium ion secondary batteries was evaluated. The results are shown in Table 1.

It was confirmed from SEM images that the iron oxides of Comparative Examples 1-1 to 1-4 and Comparative Example 2-1 were secondary particles that were all coagulated in spherical shape, and that the network structure was not formed.

As can be seen from Table 1, when $\alpha$-$Fe_2O_3$ having a network structure is used as the negative electrode active material, the capacity retention after 100 cycles is significantly increased compared with when spherical $\alpha$-$Fe_2O_3$ is used. In Comparative Examples 1-1 to 1-4, the negative electrode active material, i.e., α-Fe₂O₃ has a spherical shape. This suggests that α-Fe₂O₃ is disintegrated by electrode expansion during charging and the contact between the negative electrode active material and the conductive auxiliary agent is lost, and that, as a result, α-Fe₂O₃ that does not contribute to charging and discharging is produced, resulting in a failure to obtain sufficient cycle characteristics.

Further, as can be seen from Examples 1-13 and 1-16, when the ratio of the average network pore diameter to the average iron oxide wire diameter (average network pore diameter/average iron oxide wire diameter) is 0.2 or more, even better charging and discharging cycle characteristics can be obtained. This suggests that, because the stress due to volume expansion during charging is eased by the network structure, whereby disintegration of α-Fe₂O₃ is prevented, and that, as a result, the contact between α-Fe₂O₃ and the conductive auxiliary agent is maintained and thus excellent charging and discharging cycle characteristics are obtained.

Further, as can be seen from Examples 1-11 and 1-12, when the average iron oxide wire diameter is 200 nm or less, even better charging and discharging cycle characteristics can be obtained. This suggests that, because the stress due to volume expansion of the iron oxide particles accompanying charging is small, disintegration of the network structure is particularly prevented.

As can be seen from Examples 2-1 to 2-4 and Comparative Example 2-1, the charging and discharging cycle characteristics are degraded when acetylene black is used as the conductive auxiliary agent. Accordingly, Ketjen black is obviously advantageous over acetylene black. This suggests that, compared with acetylene black, Ketjen black provides favorable conductivity to the negative electrode active material layer, and that a favorable conductive path is formed between the iron oxide particles and the Ketjen black.

TABLE 1

| | Iron raw material | Iron source charging amount (M) | Triethanolamine charging amount (M) | Iron solution pump flow rate (ml * min⁻¹) | Hydrogen peroxide water pump flow rate (ml * min⁻¹) |
|---|---|---|---|---|---|
| Ex. 1-1 | Fe₂(SO₄)₃•H₂O | 0.45 | 2.4 | 80 | 30 |
| Ex. 1-2 | Fe₂(SO₄)₃•H₂O | 0.3 | 1.2 | 120 | 30 |
| Ex. 1-3 | Fe₂(SO₄)₃•H₂O | 0.3 | 2 | 90 | 30 |
| Ex. 1-4 | Fe₂(SO₄)₃•H₂O | 0.45 | 1.6 | 60 | 30 |
| Ex. 1-5 | Fe₂(SO₄)₃•H₂O | 0.5 | 2.4 | 60 | 30 |
| Ex. 1-6 | Fe₂(SO₄)₃•H₂O | 0.2 | 2 | 75 | 30 |
| Ex. 1-7 | Fe₂(SO₄)₃•5H₂O | 0.25 | 3.2 | 90 | 30 |
| Ex. 1-8 | Fe₂(SO₄)₃•H₂O | 0.6 | 4 | 40 | 24 |
| Ex. 1-9 | Fe₂(SO₄)₃•H₂O | 0.6 | 3 | 60 | 30 |
| Ex. 1-10 | Fe₂(SO₄)₃•H₂O | 0.4 | 4 | 40 | 30 |
| Ex. 1-11 | Fe(NO₃)₃•9H₂O | 0.6 | 6 | 35 | 24 |
| Ex. 1-12 | Fe(NO₃)₃•9H₂O | 0.6 | 6 | 35 | 36 |
| Ex. 1-13 | Fe₂(SO₄)₃•H₂O | 0.6 | 3.2 | 60 | 30 |
| Ex. 1-14 | Fe₂(SO₄)₃•H₂O | 0.65 | 2 | 75 | 30 |
| Ex. 1-15 | Fe(NO₃)₃•9H₂O | 0.8 | 10 | 40 | 24 |
| Ex. 1-16 | Fe(NO₃)₃•9H₂O | 0.8 | 10 | 25 | 18 |
| Comp. Ex. 1-1 | Fe(NO3)3•9H2O | 0.04 | 0.72 | 40 | 24 |
| Comp. Ex. 1-2 | Fe(NO3)3•9H2O | 0.04 | 0.72 | 25 | 24 |
| Comp. Ex. 1-3 | FeC₆H₅O₇•nH₂O | — | — | — | — |
| Comp. Ex. 1-4 | FeC₆H₅O₇•nH₂O | — | — | — | — |
| Ex. 2-1 | Fe₂(SO₄)₃•H₂O | 0.45 | 2.4 | 80 | 30 |
| Ex. 2-2 | Fe₂(SO₄)₃•H₂O | 0.45 | 1.6 | 60 | 30 |
| Ex. 2-3 | Fe₂(SO₄)₃•H₂O | 0.6 | 3 | 60 | 30 |
| Ex. 2-4 | Fe(NO₃)₃•9H₂O | 0.6 | 6 | 35 | 24 |
| Comp. Ex. 2-1 | Fe(NO3)3•9H2O | 0.04 | 0.72 | 40 | 24 |

| | Particle structure | Average iron oxide wire diameter (nm) | $D_{50}$ (nm) | Average mesh pore diameter (nm) | (Average network pore diameter)/ (average iron oxide wire diameter) | Discharge capacity retention after 100 cycles (%) |
|---|---|---|---|---|---|---|
| Ex. 1-1 | Network structure | 48 | — | 668 | 13.92 | 85 |
| Ex. 1-2 | Network structure | 54 | — | 359 | 6.65 | 83 |
| Ex. 1-3 | Network structure | 51 | — | 465 | 9.12 | 80 |
| Ex. 1-4 | Network structure | 89 | — | 247 | 2.78 | 78 |
| Ex. 1-5 | Network structure | 98 | — | 163 | 1.66 | 80 |
| Ex. 1-6 | Network structure | 89 | — | 18 | 0.20 | 76 |
| Ex. 1-7 | Network structure | 98 | — | 34 | 0.35 | 82 |
| Ex. 1-8 | Network structure | 186 | — | 68 | 0.37 | 72 |
| Ex. 1-9 | Network structure | 192 | — | 124 | 0.65 | 74 |
| Ex. 1-10 | Network structure | 186 | — | 221 | 1.19 | 75 |
| Ex. 1-11 | Network structure | 233 | — | 183 | 0.79 | 64 |
| Ex. 1-12 | Network structure | 287 | — | 296 | 1.03 | 66 |
| Ex. 1-13 | Network structure | 146 | — | 16 | 0.11 | 62 |
| Ex. 1-14 | Network structure | 178 | — | 28 | 0.16 | 59 |
| Ex. 1-15 | Network structure | 227 | — | 38 | 0.17 | 51 |
| Ex. 1-16 | Network structure | 273 | — | 42 | 0.15 | 52 |
| Comp. Ex. 1-1 | Spherical | — | 125 | — | — | 44 |
| Comp. Ex. 1-2 | Spherical | — | 189 | — | — | 43 |
| Comp. Ex. 1-3 | Spherical | — | 267 | — | — | 40 |
| Comp. Ex. 1-4 | Spherical | — | 631 | — | — | 32 |

TABLE 1-continued

| | | | | | | |
|---|---|---|---|---|---|---|
| Ex. 2-1 | Network structure | 48 | — | 668 | 13.92 | 64 |
| Ex. 2-2 | Network structure | 89 | — | 247 | 2.78 | 68 |
| Ex. 2-3 | Network structure | 192 | — | 124 | 0.65 | 62 |
| Ex. 2-4 | Network structure | 233 | — | 183 | 0.79 | 60 |
| Comp. Ex. 2-1 | Spherical | — | 125 | — | — | 41 |

The negative electrode active material for a lithium ion secondary battery according to embodiments of the present disclosure may include the following first to third negative electrode active materials for a lithium ion secondary battery.

The first negative electrode active material for a lithium ion secondary battery is a negative electrode active material for a lithium ion secondary battery which includes iron oxide particles as a negative electrode active material, wherein at least some of the iron oxide particles are mutually linked and form a network structure.

The second negative electrode active material for a lithium ion secondary battery is the first negative electrode active material for a lithium ion secondary battery wherein the network structure has an average network pore diameter and an average iron oxide wire diameter at an average network pore diameter/average iron oxide wire diameter ratio of ≥0.2.

The third negative electrode active material for a lithium ion secondary battery is the first or second negative electrode active material for a lithium ion secondary battery wherein the iron oxide has an average iron oxide wire diameter of 192 nm or less.

A negative electrode for a lithium ion secondary battery according to an embodiment of the present disclosure may include any of the first to third negative electrode active materials and Ketjen black as a conductive auxiliary agent.

A lithium ion secondary battery according to an embodiment of the present disclosure may be a lithium ion secondary battery including the negative electrode for the lithium ion secondary battery, a positive electrode, and a nonaqueous electrolyte.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

The present disclosure can provide a lithium ion secondary battery with excellent charging and discharging cycle characteristics.

What is claimed is:

1. A negative electrode active material for a lithium ion secondary battery, comprising a network structure formed by at least some of iron oxide particles being linked to each other, thereby forming an iron oxide wire, wherein
    in the network structure, a ratio of an average network pore diameter to the average iron oxide wire diameter (average network pore diameter/average iron oxide wire diameter) is 0.2 or more,
    the iron oxide has an average iron oxide wire diameter of 192 nm or less, and
    the average iron oxide wire diameter is defined as an average diameter of said iron oxide particles linked to each other.

2. A negative electrode for a lithium ion secondary battery, comprising:
    the negative electrode active material according to claim 1; and
    Ketjen black as a conductive auxiliary agent.

3. A lithium ion secondary battery comprising:
    the negative electrode according to claim 2;
    a positive electrode; and
    a nonaqueous electrolyte.

4. The negative electrode active material for a lithium ion secondary battery according to claim 1, wherein the iron oxide is $Fe_2O_3$.

5. The negative electrode active material for a lithium ion secondary battery according to claim 1, wherein the iron oxide is $\alpha$-$Fe_2O_3$.

6. The negative electrode active material for a lithium ion secondary battery according to claim 1, wherein the iron oxide has an average iron oxide wire diameter of 98 nm or less.

7. The negative electrode active material for a lithium ion secondary battery according to claim 1, wherein the ratio is from 0.2 to 20.

8. The negative electrode active material for a lithium ion secondary battery according to claim 1, wherein the negative electrode active material comprises 60% or more of the network structure.

9. The negative electrode active material for a lithium ion secondary battery according to claim 1, wherein the iron oxide particles forming the network structure have a primary particle diameter of from 10 nm to 100 nm.

* * * * *